Aug. 25, 1942.  E. S. GUTTMANN  2,293,733
PRECISION MEASURING DEVICE
Filed July 21, 1941  5 Sheets-Sheet 1

INVENTOR
Eric S. Guttmann
By Parker, Carlson, Pitzner & Hubbard
ATTORNEYS Aug. 25, 1942.  E. S. GUTTMANN  2,293,733
PRECISION MEASURING DEVICE
Filed July 21, 1941  5 Sheets-Sheet 3

INVENTOR
Eric S. Guttmann
By Parker, Carlson, Pitzner & Hubbard
ATTORNEYS

Patented Aug. 25, 1942

2,293,733

UNITED STATES PATENT OFFICE 2,293,733

PRECISION MEASURING DEVICE

Eric S. Guttmann, Rockford, Ill., assignor to The Ingersoll Milling Machine Company, Rockford, Ill., a corporation of Illinois Application July 21, 1941, Serial No. 403,343

18 Claims. (Cl. 33—125)

The present invention pertains to a device for making fine measurements such as are required in machine shop practice and has more particularly to do with a measuring device utilizing a flexible line helically wrapped about a drum by which an indicator is actuated as the line is reeled in and out during the displacement of a part whose motion is to be measured.

One object of the invention is to provide such a device which is embodied in the form of a complete self-contained unit of such character that it may simply and easily be applied to some member whose displacement is to be measured.

A more detailed object is to provide a measuring device of the above character in which the free end of the flexible line is guided accurately by the structure which supports the drum and simply has a loose connection with a part of the machine on which the device is to be used.

Another object is to provide in such a unitary device a novel means for excluding dust and other foreign matter from the operating parts.

Another object is to provide such a unitary device comprised of a series of demountable units which can readily be fixed together in a selected one of various angular positions so as to accommodate the application of the device to a member movable in a corresponding variety of angularly related directions.

The invention also resides in a novel resetting arrangement for the indicator of the instrument.

Further objects and advantages of the invention will become apparent as the following description proceeds taken in connection with the accompanying drawings, in which.

While the invention in susceptible of various modifications and alternative constructions, I have shown in the drawings and will herein describe in detail the preferred embodiment, but it is to be understood that I do not thereby intend to limit the invention by such disclosure but aim to cover all modifications and alternative constructions falling within the spirit and scope of the invention as expressed in the appended claims.

For purposes of illustration, the novel measuring device has been shown applied to a machine tool for registering the displacement of a movable element thereof, in this instance, a quill 16. The quill is splined for vertical movement in a guideway 14 fashioned in a housing 15 relative to which the quill is fed endwise by rotation of a drive pinion 17 meshing with a rack 18. The pinion 17 may, of course, be either hand or power actuated to feed the quill endwise. Within the quill is journaled an axially extending drive shaft 19 on the lower end of which is fixed a milling cutter 20. The measuring device herein disclosed thus serves to indicate the precise endwise displacement of the quill and cutter 20 relative to a work piece (not shown) or to a stationary part of the machine.

Figures 1, 2, 3, 4:
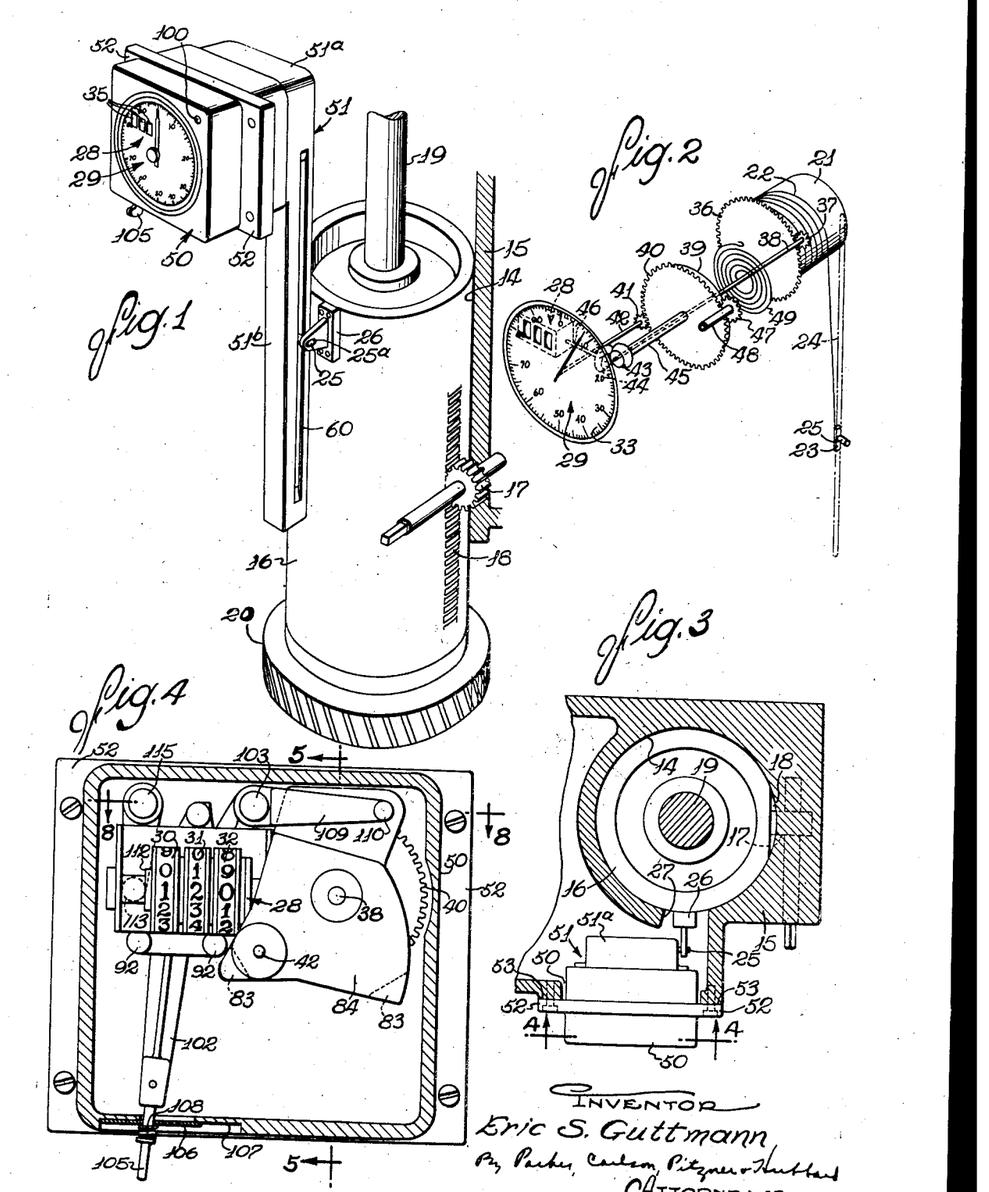
Figure 1 is a perspective view of a measuring device embodying the invention.
Fig. 2 is a diagrammatic perspective view of the main elements.
Fig. 3 is a plan section of the portion of the machine tool to which the instrument of Fig. 1 is applied.
Fig. 4 is a vertical sectional view taken substantially along the line 4—4 in Fig. 3.

As shown in Fig. 2, the instrument comprises generally a revoluble drum 21 having helically wrapped about it a flexible line 22 preferably in the form of a thin metal ribbon or tape. One end of the line is fixed to the drum and the other end is anchored to a slide 23 received in an elongated guide 24. A pin 25 provides a loose connection between the slide 23 and the quill 16 (Figs. 1 and 3) is herein received in a slot 25ª in a bracket 26 fixed to the quill and projecting through an elongated slot 27 along the side of the quill guide 15. As the quill moves endwise, the line 22 is reeled in or unreeled from the drum 21 so that the rotation of the drum is directly proportional to the displacement of the quill. Accordingly, such rotation of the drum is used to actuate an indicator.

The indicator (Fig. 2) which, for the application shown, is calibrated in terms of linear measure, comprises a multi-wheel type revolution counter 28 coacting with an open face dial type counter 29. The counter 28 has three wheels 30, 31, and 32 (see Fig. 4) each of which has digits from 0 to 9 on its periphery. These wheels are interconnected in the usual manner for such devices, so that one revolution of the wheel 32 advances the next wheel 31 a tenth of a revolution and each full revolution of the wheel 31 advances the next wheel 30 a tenth of a revolution. The wheel 31 registers in inches, the wheel 30 in tens of inches and the wheel 32 in tenths of inches. The dial type counted 29 includes a rotary pointer 34 coacting with an open face dial 33 graduated in thousandths of an inch and having a scale length totaling registrations for one-tenth of an inch. The center portions of the front sides of the wheels 31, 32 are exposed through suitable apertures 35 in the dial 33 (see Fig. 1).

To drive the indicator from the drum 21 (see Fig. 2), a gear 36 is fixed to the drum and meshes with a pinion 37. This pinion is fast on a shaft 38 which also carries a brake disk 39 urged into frictional gripping engagement with a gear 40 loosely journaled on the shaft 38. The pointer 34 is driven by a pinion 41 meshing with the gear 40 and fixed on a shaft 42 which also carries the pointer. The wheel type counter 28 is driven from the gear 40 through a pair of bevel gears 43, 44, the gear 43 being fixed to a sleeve 45 rigid with the gear 40 and the other bevel gear 44 being fixed to the drive shaft 46 of the multi-wheel counter. The frictional connection between the disk 39 and gear 40 is utilized so as to facilitate resetting of the indicator to any desired initial value. For purposes of such resetting in the form shown in Figs. 1 to 13, a pinion 47, meshed with the gear 40, is arranged to be rotated by insertion of a wrench (not shown) into the socketed end of the shaft 48 of this pinion. During such resetting operation, a brake shoe, hereinafter detailed, is engaged with the brake disk 39 so as to prevent inadvertent turning of the take-up drum 21.

A helical torsion spring 49 (Fig. 2) serves to yieldably bias the take-up drum 21 in a direction to reel in the line 22. Thus one end of the spring is fixed to the shaft 38 and the other or outer end of the spring is suitably anchored to a stationary frame part as hereinafter described. The spring thus constantly urges the drum 21 to turn in a counterclockwise direction (as viewed in Fig. 2) to reel in the line 22, and maintains a substantially constant tension in the latter.

The indicator proper is enclosed in a rectangular housing 50, while the drum 21, the line 22, the slide 23 and the guide 24 for the slide are all disposed within an elongated housing 51. The upper portion 51ª of this latter housing 51 is rectangular while the lower portion 51ᵇ is of elongated generally tubular form. The two housings 50 and 51 are adapted to be fixed together forming a unitary casing in which all of the operating parts of the measuring device are mounted and by which they are enclosed.

To install the instrument illustrated on the machine tool shown, the casing 50 is disposed in a recess 50ª in the front wall of the machine tool head (Fig. 3) and fastened to the latter by screws entered through a flange 52 which lies against a machine surface 53 on the front wall. The portion 51 of the instrument housing is thus disposed within the quill housing 15 with the pin 25 projecting through a slot 60 in the side wall adjacent the slot 27 in the quill guideway. Because the pin 25 is on the slide 23 which is independently guided in the way 24, the connection with the bracket 26 on the quill may be loose, thereby avoiding the necessity of precision in the mounting of the instrument housing. That is to say, it is only necessary to mount the instrument housing with the guideway for the slideway 23 approximately parallel to the quill guideway. Such mounting of the tape guideway directly on the main housing also facilitates servicing of the instrument.

Figures 5, 6, 7:
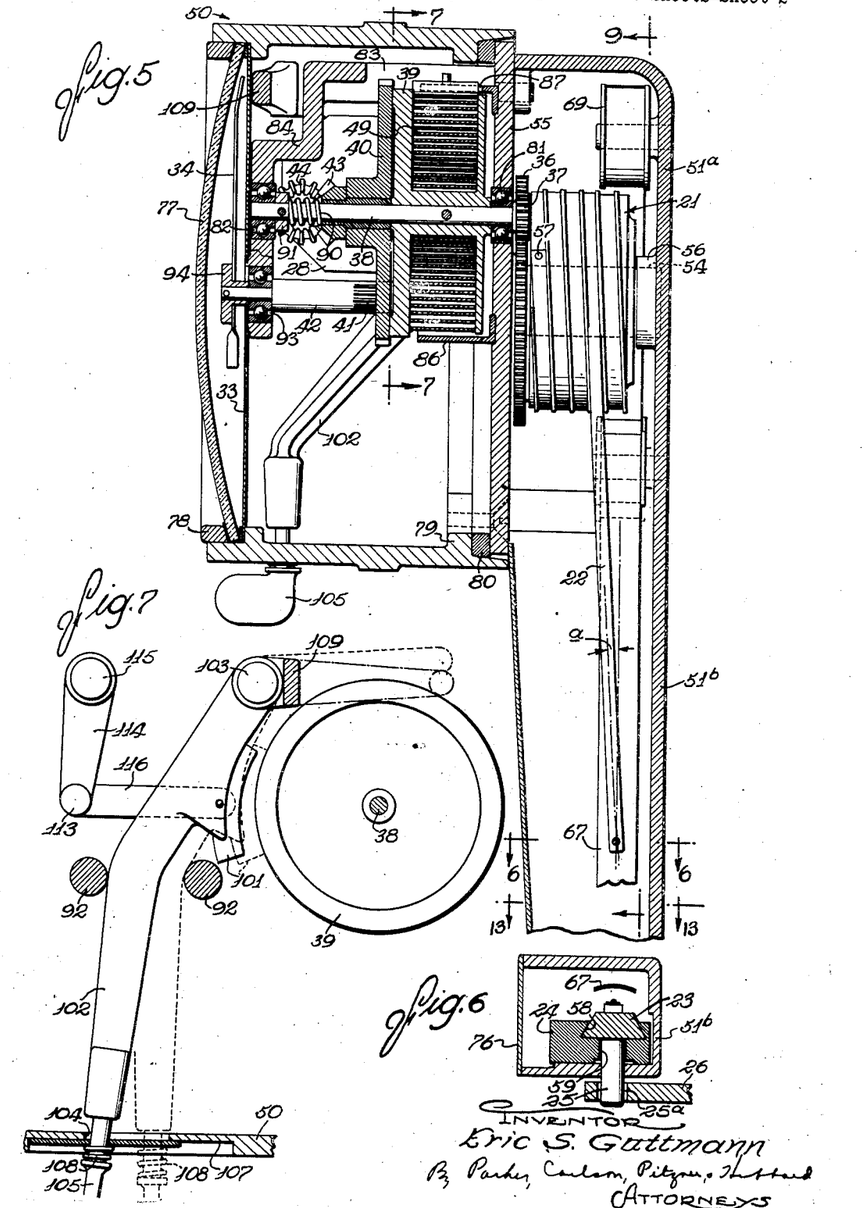
Fig. 5 is a longitudinal sectional view taken substantially along line 5—5 in Fig. 4, and with the lower portion of the tape housing broken away.
Fig. 6 is a section taken substantially along line 6—6 in Fig. 5.
Fig. 7 is an enlarged detail front elevation of the brake arrangement included in the resetting mechanism for the indicator with certain of the parts shown as sectioned substantially along the line 7—7 in Fig. 5.
Figures 9, 10, 11:
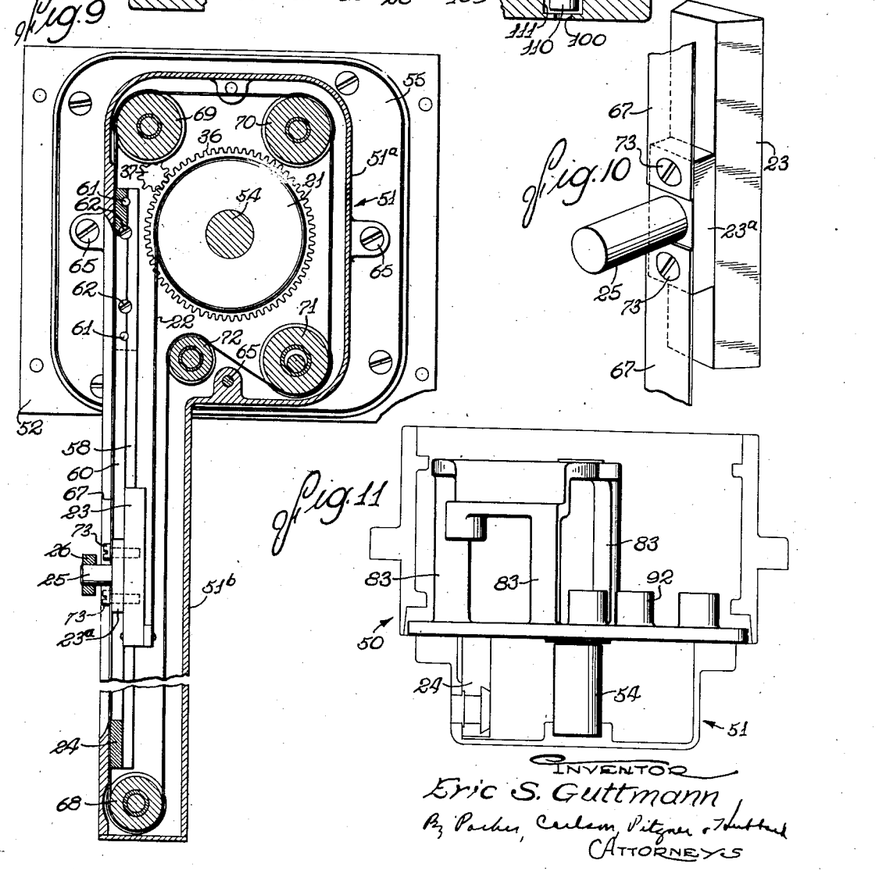
Fig. 9 is a vertical sectional view taken substantially along the line 9—9 in Fig. 5.
Fig. 10 is an enlarged detail perspective view of a slide and attachment pin to which the unreeled end of the flexible line or tape is fixed.
Fig. 11 is a detail top view of the mounting base included in the instrument, with the associated parts shown in light lines.

Having in mind the general layout of the instrument as set forth above, the construction of the various component elements may now be detailed. Referring to Figs. 5 and 9, the drum 21 is freely revoluble upon a stationary shaft 54 within the rectangular upper portion 51ª of the rear housing 51. This shaft 54 is rigid with the rear or base plate 55 of the indicator unit assembly (Fig. 11) and its outer end is received in a socket 56 on the inner face of the housing 51. The periphery of the drum is helically grooved and the roots of the groove which receive the line 22 are ground to size with extreme precision. The inner end of the tape is anchored to the drum as indicated at 57 in Fig. 5 while, as heretofore noted, the other or free end of the line is anchored to the slide 23 (see Fig. 9).

In order that the circumferential displacement of the drum will exactly equal the linear displacement of the quill throughout the range of the latter, it is necessary to maintain constant the included angle $a$ between the unreeled portion of the tape 22 and the path of the free end of the tape which path is determined by the guideway for the slide 23. The maintenance of this angular relation is insured in the present instrument because the guideway 24 is included as a unitary part of the instrument itself. Thus, the guideway may be located more easily and with greater accuracy in the initial construction and assembly of the unitary instrument than would be possible in the attachment of the instrument to the machine with which it is to be used.

The guide 24 (see Figs. 6, 9, and 12) is a metal bar having an elongated groove 58 dovetailed, in this instance, and receiving the complementally shaped slide 23. A longitudinal slot 59 in the guide bar 24 registers with a similar slot 60 in the housing extension 51ᵇ through which slots the pin 25 on the slide 23 projects.

Figures 12, 13:
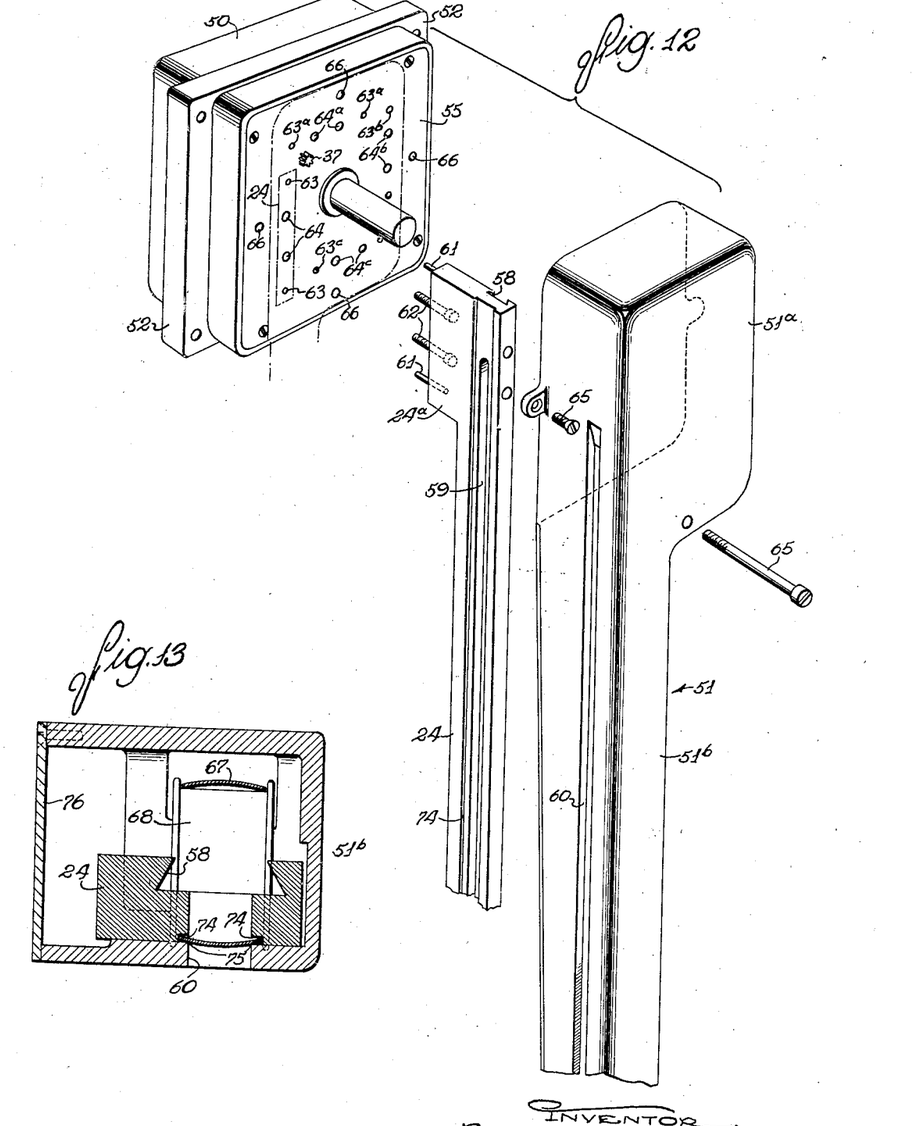
Fig. 12 is an exploded perspective view of the instrument housing.
Fig. 13 is a section taken substantially along the line 13—13 in Fig. 5.

Though the guide 24 is located within the rear housing 51, it is rigidly attached to the base plate 55 of the front housing 50 (Figs. 9 and 12). For this purpose, it has an enlarged head 24ª which is located in position on the plate 55 by a pair of dowel pins 61 and removably attached to the plate by a pair of screws 62. Thus, both the guide 24 and drum 21 are supported from the same member, namely, the base plate 55, so that the requisite angular relation between the drum axis and guideway is always fixed.

When the guide 24 is disposed to extend vertically, as shown in Figs. 1 and 2, the dowel pins 61 are received in a pair of holes 63 in the base plate 55 (Fig. 12) and the screws 62 threaded into a pair of tapped holes 64. Also in such case, the rear housing 51 is fixed to the base plate 55 by three screws 65 threaded into holes 66 in the base plate. Three alternatively available sets of holes 63ª, 63ᵇ, and 63ᶜ, and three corresponding sets of holes 64ª, 64ᵇ, and 64ᶜ for the dowel pins 61 and screws 62 respectively are provided in the base plate 55 to accommodate location of the guideway 24 to extend respectively horizontally to the left (as viewed in Fig. 12), vertically upward, or horizontally to the right. Similarly, the housing 51 may be positioned to correspond to the position of the guide 24 and attached to plate 55 by utilizing the proper holes 66. All of the sets of holes are centered about the axis of the drum shaft 54 so that the change in position of the guide and housing does not affect the drum position and the gear 36 fixed on the drum remains properly in mesh with its driven pinion 37. Thus, the tape may be led off from the drum in a plurality of angles without changing the upright position of the dial face.

Figure 16:
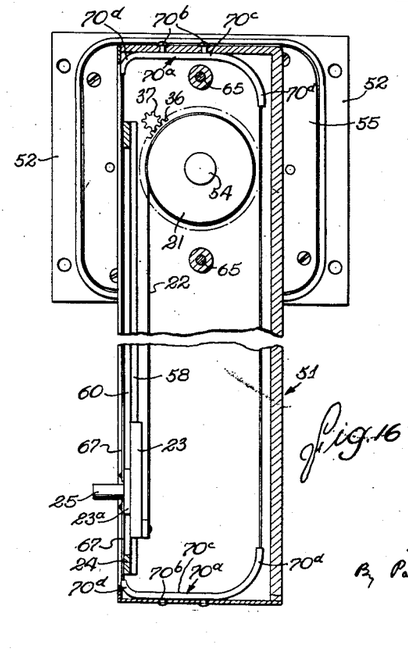
Fig. 16 is a vertical sectional view similar to Fig. 9 illustrating a modified form of tape enclosure.
Figure 17:
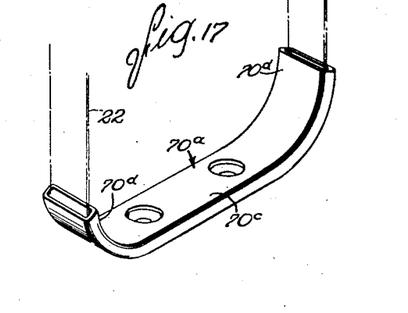
Fig. 17 is a fragmentary perspective view of a portion of Fig. 16.

In accordance with the present invention, provision is made for sealing the slot 60 while permitting projection of the connecting pin 25 therethrough and movement of the pin along the slot. This is accomplished by a traveling medium 67 moved along the slot with the pin. The medium herein shown comprises a flexible ribbon, preferably of resilient steel, led over suitable guides with opposite ends attached to the block 23ª on the slide 23 by screws 73, thus forming an endless loop. In the form shown in Figs. 9, 10, and 13, the guides comprise pulleys 68 and 69 in opposite ends of the housing 51 and pulleys 70, 71, and 72 spaced around the drum 21. A simplified guide arrangement is shown in Figs. 16 and 17, the guides comprising tubes 70ª somewhat longer than the diameter of the drum 21 and fastened by rivets 70ᵇ in opposite ends of the tape housing. As shown, these guides are formed by flattening seamless copper tubing to form a substantially straight intermediate portion 70ᶜ and end portions 70ᵈ gradually curved to their ends which extend substantially perpendicular to the straight portions. The cross-section of the tube is such that the ribbon will slide therethrough readily and around the curved parts.

In both of the arrangements above described, the ribbon 67 bridges the slot 60 in the housing 51 throughout its length and the edges of the tape are received in undercut grooves 74 in the guide bar 24 (see Fig. 13). The tape 67 is bowed or curved in cross-section as shown in Fig. 13 and thus frictionally engages the housing at 75 at the edges of the slots 60 so as to maintain an effective seal throughout the length of the latter.

It will be observed that the ribbon 67 completely closes and effectually seals the end portions of the slot 67 on opposite sides of the connecting pin 25 and this in all positions of the guide bar 24. This is because the ribbon, being connected at opposite ends to the pin, is shifted endwise around its guides as the pin is moved back and forth during reeling and unreeling of the measuring tape 22.

Access may be had to the parts within the extension 51ᵇ of the housing 51 by removal of a cover plate 76 (Figs. 5, 6, and 13). As shown, the housing extension 51ᵇ is generally channel shaped in cross-section and the cover plate 76 is screwed in place to close the open side of the channel.

Turning now to a consideration of a mechanism housed in the other or front casing section 50, it will be observed from Fig. 5 that the front of this housing 50 is covered by a transparent glass disk 77 held against the face of the dial 33 by a bezel 78. The rear face of the housing is closed by the base plate 55 which is screwed to a shoulder 79 within the housing with a packing 80 interposed between the shoulder and base plate. Thus, both the front and rear sides of the housing 50 are effectually sealed.

Projecting forwardly through the housing 50 is the shaft 38 (Fig. 5) carrying the drum driven pinion 37. This shaft is journaled at its inner end in an antifriction bearing 81 fixed in the base plate 55 and at its outer end in an antifriction bearing 82 fixed in a bracket rigid with the base plate. This bracket comprises three upstanding legs 83 integral with the base plate and also integral with a generally triangular plate 84 (see Fig. 4 for a face view of the latter).

Figure 8:
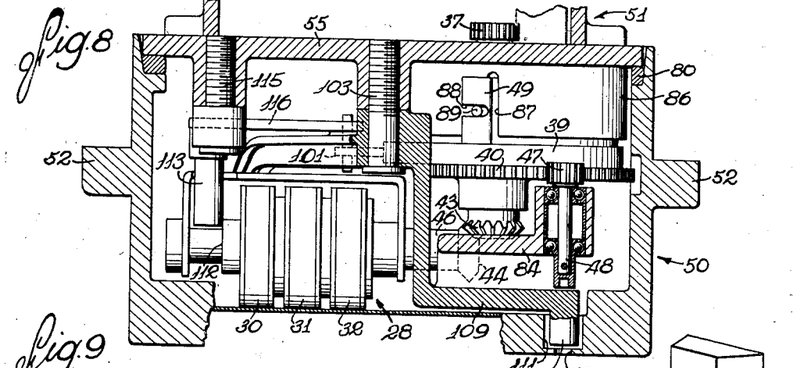
Fig. 8 is a section taken substantially along the line 8—8 in Fig. 4.

Pinned to the shaft 38 is a spool shaped member 85 whose left hand end member constitutes the brake disk 39. The torsion spring 49 is received in this spool 85 with its inner end anchored to the hub of the latter. An annular casing 86, fixed to the base plate 55, encloses the spring and has a transverse slot 87 therein (see also Fig. 8) through which the end of the spring projects. This projecting end of the spring is bent back over the exterior of the casing 86 and is slotted as indicated at 88 to engage an anchorage pin 89 on the casing. The anchored end of the spring 49 is thus held against movement laterally of the casing and, being hooked to the latter, is anchored against movement circumferentially of the casing. However, the pin and slot type of anchorage used permits the projecting end of the spring to flex slightly in a direction radially outward of the surface of the casing 86 so that the spring is not distorted as it is coiled up about the hub of the spool member 85 as it would be if the outer end of the spring were rigidly anchored to the casing 86.

The gear 40 within the housing 50 is, as heretofore noted, fixed to the sleeve 45 freely journaled on the shaft 38. A helical compression spring 90 interposed between a collar 91 pinned to the shaft 38 and the front face of the beveled gear 43, which is also rigid with the sleeve 45, yieldably urges the face of the gear 40 into frictional engagement with the opposed face of the brake disk 39. With the members 39 and 40 thus held in frictional engagement, the gear 40 turns in unison with the drum driven shaft 38.

The connection through the bevel gears 43, 44 to the multi-wheel type counter 28 has been heretofore described. This counter 28 is supported by studs 92 on the base plate 55. The shaft 42 (see Fig. 5) which connects the gear 40 to revolve the indicator needle 34 is journaled by an antifriction bearing 93 also mounted in the bracket plate 84. The needle 34 is fixed to the forward end of this shaft by a hub 94 while the inner end of the shaft carries the pinion 41 which meshes with the gear 40.

In the form shown in Figs. 1 to 13, the reset mechanism operates through the gear 40 and pinion 47 to turn the indicator back to zero or to any other particular setting which may be desirable in the course of operation of the instrument. The socketed forward end of the shaft 48, which is engaged by a wrench to turn the reset pinion 47, is accessible through an opening 100 in the upper front side of the casing 50 (see Figs. 1 and 8). Provision is made, however, for closing the aperture 100 at all times except when a brake shoe is engaged with the brake disk 39. In this way, inadvertent turning of the brake disk 39 and drum 21 by the operation of the reset pinion 47 is prevented. In other words, the reset pinion 47 is accessible for turning only when the drum 21 is brake-held against rotation.

The brake mechanism as shown in Figs. 4 and 7 comprises a shoe 101 pivotally mounted on an intermediate portion of a swinging actuator arm 102. The latter is pivoted on a pin 103 threaded in the base plate 55 (see also Fig. 8). The other end of the swinging lever 102 projects through a slot 104 in the casing 50 and has a finger grip or handle 105 on its outer end. The slot 104 is closed by a sliding plate 106 mounted on a recess 107 in the lower side of the housing 50, and a compression spring 108 is interposed between the handle 105 and the opposed face of the plate 106. This spring not only holds the plate in place but also frictionally retains the brake lever at any position to which it may be shifted by virtue of the frictional engagement by the plate 106 with the bottom of the recess 107 against which it is pressed. The lever 102 is movable between the studs 92 which support the multi-wheeled counter 28 and which act as stops for the same.

An extension arm 109 (Figs. 7 and 8) is fixed to the upper end of the arm 102 and moves in unison with it as the latter is swung about its pivot 103. The outer end of the extension 109 has a head 110 thereon disposed in a recess 111 in the casing 50 behind the aperture 100. When the brake actuator arm 102 is in the position shown in full lines in Fig. 7, the head 110 closes the aperture 100 so that access cannot be had to the socketed end of the reset pinion shaft 48 and it thus, in effect, disables the reset mechanism against operation. When, however, the actuator arm 102 is swung to the position shown in broken lines in Fig. 7, to engage the brake shoe 101 with the brake disk 39, the head 110 is swung clear of the aperture 100.

Movement of the brake actuator arm 102 also serves to shift a reset collar 112 (Figs. 4 and 8) for the multi-wheel type counter 28. This collar 112 is normally spring urged to the position shown in Fig. 8 but, when shifted to the right, releases the counter wheels 30, 31, and 32 so that one revolution of the bevel gears 43, 44 will reset the counter to zero. The mechanism within the counter 28 which is actuated by the collar 112 is of conventional construction available in units of this type now on the market and consequently need not be detailed here. Ten revolutions of the reset pinion shaft 48 are required to effect one full revolution of the bevel gears 43, 44 for resetting the multi-wheel counter 28 fully back to zero. To shift the collar 112 to the right (as viewed in Figs. 4 and 8), a pin 113 is arranged to project into engagement with it. This pin 113 is mounted on the lower end of a link 114 (Fig. 7) pivoted by a pin 115 on the base plate 55. The link 114 is pivotally connected by a transverse link 116 with the brake shoe actuator arm 102. Consequently, when the arm 102 is swung to engage the brake shoe 101 with the drum 39, it also shifts the pin 113 so that the latter thrusts the collar 112 inward. Restoration of the actuator arm 102 to its initial position, of course, causes the pin 113 to release the collar 112 so that the latter is permitted to spring back to its initial position.

Figure 14:
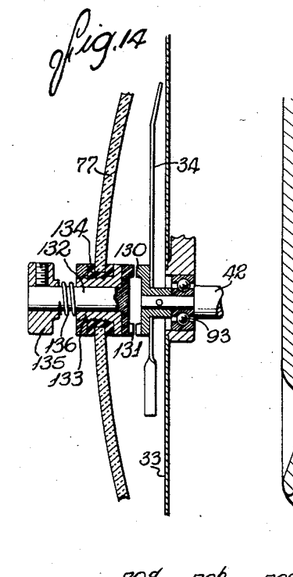
Fig. 14 is a fragmentary sectional view similar to Fig. 5 showing a modified arrangement for resetting the indicator pointer.

Fig. 14 shows a modified actuator for turning the shaft 42 to reset the counter. In this instance, the extended end of the needle shaft 42 is formed with clutch dogs 130 interengageable with dogs 131 on a shaft 132 journaled in a bushing 133 which is supported in rubber grommet 134 mounted in a hole formed in the center of the bezel 77. By grasping a knob 135 on its outer end, the shaft 132 may be shifted axially against the action of a spring 136 to engage the clutch 130—131 whereupon the shaft 42 may be turned to reset the counter. The clutch disengages automatically when the knob is released.

Figure 15:
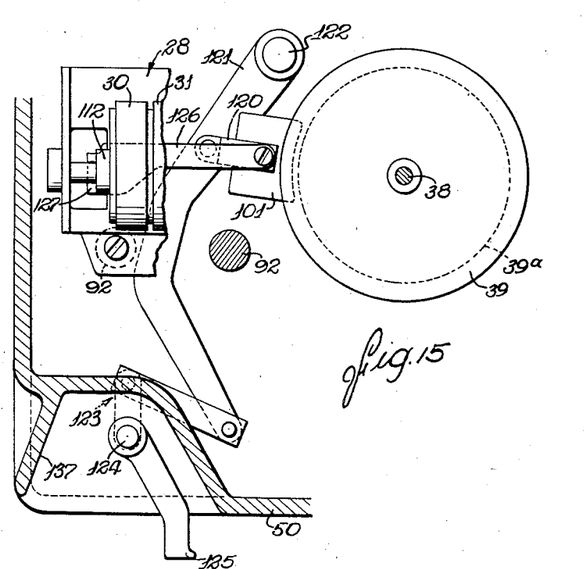
Fig. 15 is a view similar to Fig. 7 illustrating a modified form of brake and resetting mechanism.

In the modified resetting mechanism shown in Fig. 15, the effectiveness of the brake shoe 101 is increased by making it tapered and adapted for engagement in a V-groove 39ª in the periphery of the disk 39. The shoe is on the end of a link 120 connected to a lever 121 pivoted at 122 and connected at its free end to one link of a toggle 123. The other link of the latter is fast on the end of a rockshaft 124 projecting into a side recess 137 in the bottom of the casing 50. By shifting a lever 125 to the left, as viewed in Fig. 15, the toggle is straightened and the shoe 101 pressed into the groove to set the brake. At the same time, a link 126 is shifted in a direction such that a yoke 127 on its end shifts the collar 112 to condition the counter for resetting. With the toggle thus straightened, little effort is required to be applied to the lever 125 in order to hold the brake set.

Brief résumé of operation

In applying the measuring instrument to a machine tool or the like, the rear housing 51 (Fig. 12) is removed and the guide 24 fixed by the dowels 61 and screws 62 to project up or down, right or left as may be required in the particular installation. The housing 51 is then replaced and the unit fixed in place by bolts through the mounting flanges 52 so that the groove 58 in the guide 24 quite closely parallels the path of the member whose displacement is to be measured such, for example, as the quill 16 in Fig. 1. Finally, the pin 25 is connected loosely to the bracket 26 on such movable member.

Having thus installed the instrument, it is conditioned to register continuously and with extreme precision the displacement of the movable member such as the quill 16. During such operation, the slide 23 is traversed along the guide 24 in unison with the quill 16. As the slide 23 moves to and fro, the drum 21 reels in or lets out the line 22 as the case may be, the spring 49 serving at all times to yieldably urge the drum to turn in a direction to reel in the line.

The rotation of the drum 21, occasioned by reeling in and out of the line 22, drives the indicator mechanism which registers continuously the location of the quill 16 in inches, tenths, hundredths, and even thousandths thereof. In the course of such normal operation, the housing of the unitary structure is closed by the dust-tight sealing means heretofore described whereby the instrument is thoroughly protected against dust and dirt which might lodge in the drum 21 or other parts and impair accuracy of operation.

To reset the indicator back to zero at any time, the operator actuates the brake handle to set the brake and hold the drum 21 against turning. This same movement pushes in the collar 112 to condition the wheel counter for resetting. Then, the operator turns the pointer shaft 42 until the wheels of the counter are all returned to zero which requires ten revolutions, such turning being interrupted when the needle 34 is at zero.

I claim as my invention:

1. A self-contained measuring device adapted for application as an assembled unit to a machine having relatively movable members whose displacement relative to each other is to be measured, said device comprising, in combination, an elongated guide having a slide thereon, said slide being connectable to one of the members whose displacement relative to another member is to be measured, means actuated in response to movement of said slide along said guide, and means supporting said guide and said first mentioned means in a unitary assembly.

2. A self-contained measuring device adapted for application as an assembled unit to a machine having relatively movable members whose displacement relative to each other is to be measured, said device comprising, in combination, an elongated guide, a slide thereon, a revoluble drum, a line wrapped about said drum and attached to said slide, an indicator actuator driven by said drum, means for connecting said slide to one of the members, and means for supporting said guide and drum and indicator in a unitary assembly on the other of said members.

3. A self-contained measuring device adapted for application as an assembled unit to a machine having relatively movable members whose displacement relative to each other is to be measured, said device comprising, in combination, a casing constituting a unitary structure and adapted to be mounted on one of said members, an indicator in said casing, an elongated guide on said casing, a slide movable along said guide and connectable to the other of said members, and means for actuating said indicator in response to displacement of said slide along said guide.

4. A unitary measuring apparatus comprising, in combination, a casing adapted to be mounted on a machine part, an elongated rectilinear guideway rigid with said casing, a member slidable along said guideway and adapted for connection externally of said housing to another machine part movable relative to said first mentioned part, a drum rotatably mounted in said casing, and a flexible line wrapped helically around said drum with the end of its unreeled portion fastened to said slide within said casing.

5. A precision measuring device comprising, in combination, a support, a drum, means revolubly mounting said drum on said support, a flexible line helically wrapped about said drum with one end anchored thereto and the other end leading away therefrom, means yieldably biasing said drum to turn in a direction to reel in the line, an indicator actuated in response to rotation of the drum, a slide fixed to said other end of the line and attachable to a member whose displacement relative to another member is to be measured, and a guide rigid with said support for guiding said slide for movement in a fixed path disposed at a constant angle to the portion of the line leading from the drum to the slide equal to the helix angle of the line on the drum.

6. A precision measuring device comprising, in combination, a support, a shaft rigid with said support and projecting outwardly therefrom, a drum journaled on said shaft, a flexible line helically wrapped about said drum with one end anchored thereto and the other end leading away therefrom, means yieldably biasing said drum to turn in a direction to reel in the line, an indicator actuated in response to rotation of the drum, a slide fixed to said other end of the line and attachable to a member whose displacement relative to another member is to be measured, and a guide rigid with said support for guiding said slide for movement in a fixed path disposed at a constant angle to the portion of the line leading from the drum to the slide equal to the helix angle of the line on the drum.

7. A precision measuring device comprising, in combination, a supporting plate, a drum, means revolubly mounting said drum on one face of said plate, an elongated guide rigid with said one face of said plate and extending laterally away from said drum, a slide carried by said guide for movement along the same and attachable to a member whose displacement is to be measured, means including a flexible line wrapped about said drum and attached to said slide for revolving said drum in timed relation with the movement of said slide along said guide, an indicator mounted on the face of said supporting plate opposite said drum, means for actuating said indicator in response to rotation of said drum, first and second housings disposed on opposite sides of said supporting plate and fixed thereto, said first housing enclosing said indicator, and said second housing enclosing said drum and having an elongated portion also enclosing said guide and slide and the portion of the line leading from the drum to said slide.

8. A unitary type measuring device comprising, in combination, a visual indicator mechanism having a housing for the same, an elongated guide, a slide traversable along said guide and attachable to a member whose displacement is to be measured, means for actuating said indicator in response to movement of said slide, and means for connecting said guide and housing together with said guide projecting outward from the housing in any one of a plurality of various angular positions, whereby to permit attachment of said slide to a member movable in a corresponding direction relative to the housing while still retaining said indicator in a predetermined position suitable for easy reading of the same.

9. A unitary type measuring device comprising, in combination, a support, a drum revolubly mounted on said support, an elongated guide having a slide traversable along it, means including a flexible line wrapped about said drum and anchored to said slide for revolving said drum in response to movement of said slide along said guide, an indicator on said support, means for connecting the slide to a member whose displacement is to be measured, means for actuating said indicator in response to rotation of the drum, and means for fixing said guide to said support in any one of a plurality of angular positions symmetrically located about the axis of rotation of said drum.

10. A unitary type measuring device comprising, in combination, a supporting plate, an indicator mounted one side of said plate, a drum revolubly mounted on the opposite side of said plate for rotation about an axis normal to the plate, an elongated guide having a slide traversable along it, said slide being attachable to a member whose displacement is to be measured, means including a flexible line wrapped about said drum and anchored to said slide for revolving said drum in timed relation with the movement of the slide along said guide, means for actuating said indicator in response to rotation of the drum, said supporting plate having a plurality of sets of holes therein distributed symmetrically about the axis of rotation of said drum, and means including fasteners insertable into said holes for securing said guide rigidly to said plate to project laterally away from said drum in any one of a plurality of selectively available positions corresponding to the location of said sets of holes.

11. A measuring device comprising, in combination, two supports adapted to be fastened together in any one of a plurality of positions angularly spaced about a fixed axis, an indicator having an element rotatably mounted on one of said supports, a slide mounted for reciprocation on the other support, a drum rotatably mounted on one of said supports and connected to said element to turn the latter, and a flexible line wrapped around said drum and having an unreeled portion connected to said slide.

12. In a precision measuring instrument, the combination of a dust proof housing having an elongated slot therein, an indicator in said housing, means for actuating said indicator including a connecter disposed in said slot for movement along the same and attachable to an adjacent member whose displacement is to be measured, and closure means for maintaining the portion of the slot on either side of the connecter closed irrespective of the position of said connecter along the length of said slot.

13. In a precision measuring instrument, the combination of a dust proof housing having an elongated slot therein, an indicator in said housing, a slide, means for guiding said slide for movement within said housing along said slot, a connecter extending from said slide out through said slot for attachment of the slide to a movable member whose displacement is to be measured, means for actuating said indicator in response to movement of said slide along said slot, a flexible closure tape fixed to said slide and extending therefrom in opposite directions along said slot, and means for maintaining said tape in position to retain closed the portions of said slot lying on opposite sides of the slide and irrespective of the latter's position along the slot.

14. In a precision measuring instrument, the combination of a dust proof housing having an elongated slot therein, an indicator in said housing, a slide, means for guiding said slide for movement within said housing along said slot, a connecter extending from said slide out through said slot for attachment of the slide to a movable member whose displacement is to be measured, means for actuating said indicator in response to movement of said slide along said slot, a flexible closure tape fixed to said slide and extending in a continuous loop therefrom, and means for supporting said tape in position to extend along said slot on both sides of said slide and to retain closed the portions of said slot lying on said opposite sides of said slide.

15. In a precision measuring instrument, the combination of a dust proof housing having an elongated slot therein, an indicator in said housing, a slide, means for guiding said slide for movement within said housing along said slot, a connecter extending from said slide out through said slot for attachment of the slide to a movable member whose displacement is to be measured, means for actuating said indicator in response to movement of said slide along said slot, a flexible closure tape fixed to said slide and extending therefrom in opposite directions along said slot, said tape being of greater width than said slot, and means defining guide grooves for receiving the edges of said tape and of a lesser width than said tape, whereby the tape is buckled transversely into tight frictional engagement with the edges of said guide grooves.

16. In a measuring instrument, the combination of an indicator, an actuator for said indicator including a revoluble member, a manually operable device for resetting said indicator, a closure member movable into and out of position for preventing access to said resetting device, a brake for holding said revoluble member against turning, and means for simultaneously applying said brake and moving said closure member to a position permitting access to said resetting device.

17. In a measuring instrument, the combination of an indicator, an actuator for said indicator including a revoluble member, a manually operable device for resetting said indicator, means normally disabling said resetting device, a normally released brake for holding said revoluble member against rotation, and interlock means for preventing conditioning of the reset device for operation except when said brake is applied to hold said revoluble member against rotation.

18. In a measuring instrument, the combination of an indicator, an actuator for said indicator, means for connecting said indicator in driven relation with said actuator, said last mentioned means including frictionally engageable driving and driven members, a manually operable device for resetting said indicator, a housing for said indicator and actuator, said housing having an aperture therein affording access to said resetting device, a brake for holding said driving member against rotation, a lever for setting said brake and operable from the exterior of said housing, a closure member movable into and out of position to close said aperture, and means actuated by said arm for moving said closure member into closed position relative to said aperture upon shifting of said arm in a direction to release said brake and vice versa.

ERIC S. GUTTMANN.